United States Patent [19]

Gant

[11] Patent Number: 4,598,750

[45] Date of Patent: Jul. 8, 1986

[54] TIRE INFLATION/DEFLATION SYSTEM

[76] Inventor: Lawrence A. Gant, 1027 Harvard, Gross Pointe Park, Mich. 48230

[21] Appl. No.: 672,056

[22] Filed: Nov. 16, 1984

[51] Int. Cl.$^4$ .......................................... B60C 23/00
[52] U.S. Cl. ................................... 152/416; 137/225
[58] Field of Search .............................. 152/415–416, 152/417, 427, 429; 137/223, 224–225, 227, 228, 230

[56] References Cited

U.S. PATENT DOCUMENTS

| | | | |
|---|---|---|---|
| 1,855,101 | 4/1932 | Daneel | 152/416 |
| 2,579,048 | 12/1951 | Paul | 152/416 |
| 2,944,579 | 7/1960 | Kamm et al. | 152/416 |
| 4,384,543 | 5/1983 | Wong | 137/230 |
| 4,431,043 | 2/1984 | Goodell et al. | 152/417 |
| 4,434,833 | 3/1984 | Swanson et al. | 152/417 |

Primary Examiner—Lois E. Boland
Attorney, Agent, or Firm—Peter A. Taucher; John E. McRae; Robert P. Gibson

[57] ABSTRACT

An automatic tire inflation/deflation system for a vehicle with pneumatic tires. The system may be incorporated into existing vehicles without modification of the axles, wheels or tires. A pressure-responsive bellows is utilized at each wheel to open or close the existing tire valve in accordance with air pressure values applied to the bellows exterior surface. A selector valve at the driver's station permits the human driver to remotely control the tire inflation or deflation process. During normal run operations, the air passage system is depressurized.

1 Claim, 4 Drawing Figures

TIRE INFLATION/DEFLATION SYSTEM

GOVERNMENT INTEREST

The invention described herein may be manufactured, used, and licensed by or for the Government for governmental purposes without payment to me of any royalty.

SUMMARY AND BACKGROUND

The present invention relates to mechanism for inflating and deflating pneumatic tires on a moving or stationary vehicle. The ability to inflate and deflate tires is extremely useful for mating the tire traction with the terrain and for obtaining best features of tire wear and vehicle riding quality. When greater traction is needed (for example in snow or sand), the tires can be partially deflated to give more surface contact with the terrain. When less traction is needed (such as on a paved highway), the tire is inflated, reducing rolling resistance.

The inflation/deflation feature is also useful when the vehicle payload weight varies. When the vehicle payload is increased, greater total force is exerted on the tires. The greater force increases the surface area of the tire in contact with the terrain. To balance this force, the tire pressure should be increased to keep traction and rolling resistane at their optimum. When the payload weight is reduced, the total force exerted on the tires is decreased. The tire pressure should be reduced for traction, riding quality, and rolling resistance to remain at an optimum.

There are in existence some patented devices designed for tire inflation/deflation purposes. Examples of such devices are shown in U.S. Pat. No. 1,855,101 to R. Daneel, U.S. Pat. No. 2,579,048 to W. Paul, U.S. Pat. No. 2,944,579 to W. Kamm et al, U.S. Pat. No. 4,431,043 to F. Goodell et al, and U.S. Pat. No. 4,434,833 to G. Swanson, et al.

The present invention is directed to a tire inflation/deflation system for a military (or civilian) vehicle wherein:

1. The tire pressure can be controlled at any selected value within the pressure range of the system.
2. The tire pressure can be changed while the vehicle is either moving or stationary.
3. Each tire has an individual sealing mechanism associated therewith, whereby loss of pressure in one tire does not affect the pressure in the remaining tires.
4. Inflation/deflation air lines used in the system are depressurized while the vehicle is in its normal run mode, whereby leak damage or breakage of lines will not cause loss of air reserve or tire pressures.
5. Tire pressurization/depressurization operations can be performed in a comparatively short period of time without leaving the vehicles armor protection or stopping as may be necessary to quickly convert the vehicle from a soft-soil operating mode to a paved highway mode, or vice versa.
6. The system can be incorporated into existing vehicles with minimum modification of the vehicle structure.
7. The system is manufacturable and installable on the vehicle at a relatively small cost.

THE DRAWINGS

FIG. 1 diagrammaticlly illustrates a tire pressurization/depressurization system embodying my invention.

THE INVENTION IN GREATER DETAIL

Figure 1:
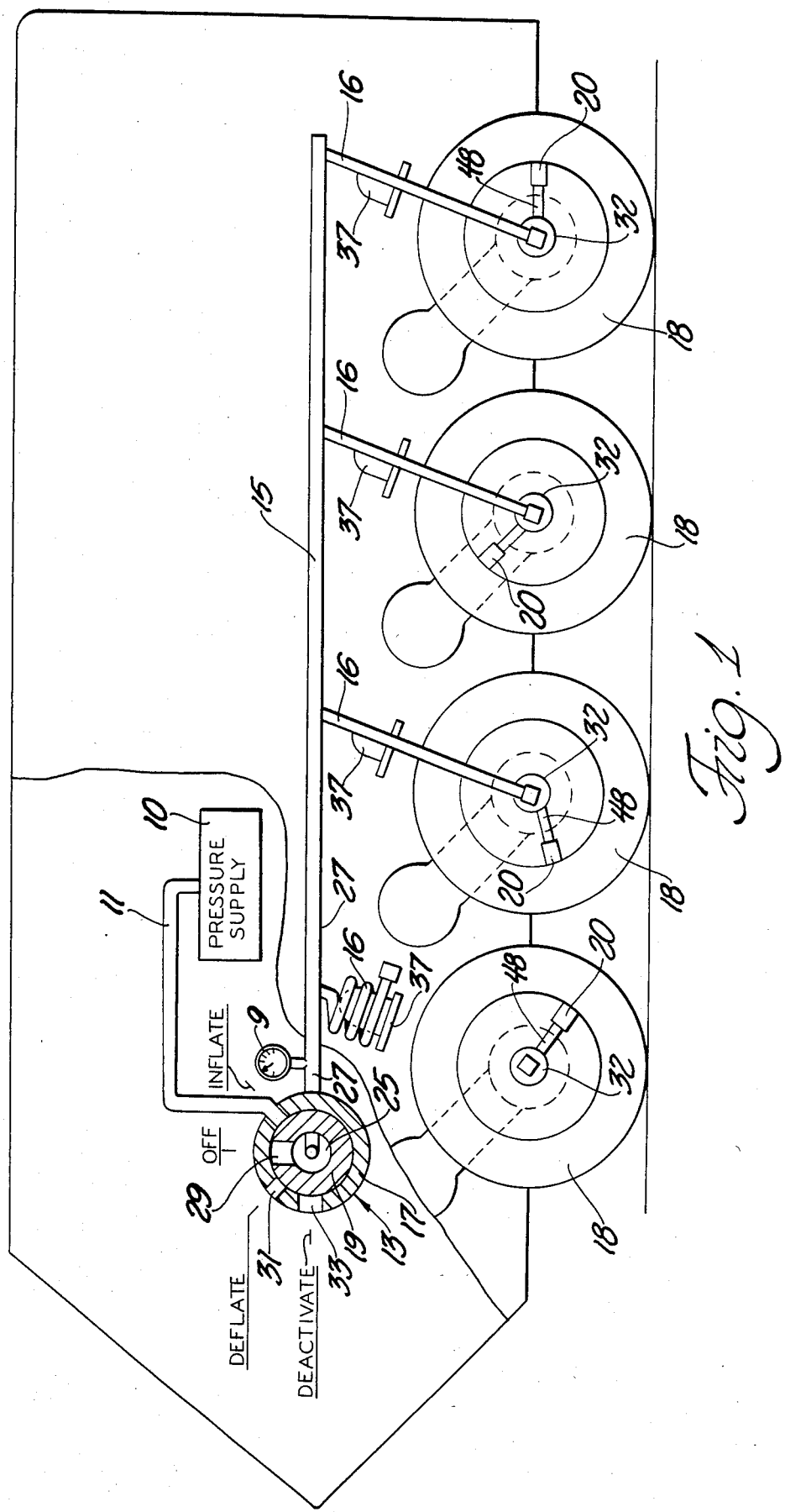

FIG. 1 schematically illustrates the general mode of operation of a centrally controlled tire inflation/deflation system constructed according to my invention. The system comprises a central air pressure source 10 having an air line 11 leading to a manually operated selector valve 13. Source 10 will be at a pressure somewhat higher than the maximum tire pressure to be achieved. For example, if the maximum tire pressure is 65 p.s.i., the source pressure could be 80 or 90 p.s.i.

Valve 13 is shown in schematic fashion. As shown, the valve comprises a cylindrical housing 17 and a rotary valve element 19. A handle or lever, not shown, would be provided for rotating element 19 to any one of four different positions, namely "off," "inflate," "deflate," or "deactivate." Element 19 is shown in its "off" position.

Rotor element 19 defines a central cavity or chamber 25 having continuous communication with an air passage 27 leading to the vehicle tires. A radial port 29 leads from cavity 25 to the cylindrical wall of housing 17. In the illustrated position of element 19, air passage 27 is sealed from pressure supply 10 and from atmosphere.

Clockwise rotation of element 19 approximately forty-five degrees causes port 29 to register with line 11; this is designated as the "inflate" position. Pressurized air from source 10 flows through line 11 into port 29 and cavity 25, thence into air passage 27 for inflating the vehicle tires.

Counterclockwise rotation of element 19 approximately forty-five degrees causes port 29 to register with small vent port 31. Air passage 27 is thereby depressurized to a relatively low pressure, e.g., 15 p.s.i.g. This position is designated as the "deflate" position.

Counterclockwise rotation of element 19 an additional forty-five degrees (a total of ninety degrees) causes port 29 to register with large vent port 33; this is designated as the "deactivate" position. Air passage 27 is depressurized to a very low pressure, e.g., 0 p.s.i.g.

Selector valve 13 is preferably located in the cab area of the vehicle adjacent to the driver's station. Pressure supply 10 would usually be an air compressor and associated surge tank located outside the cab area; suitable controls would be provided to turn the compressor on and off, as necessary to maintain a desired supply pressure in line 11. The on-board equipment preferably includes a pressure guage 9 located on or near the dashboard for viewing by the driver. Guage 9 senses the pressure existing in air passage system 27.

In the illustrated system numeral 27 represents the entire air passage system, from valve 19 to the vehicle tires. As seen in FIG. 1, air passage system 27 includes a horizontal line 15 extending rearwardly from valve 13 and four branch lines 16 extending downwardly from the horizontal line to individual ones of the vehicle wheels. The air passage system shown in FIG. 1 supplies air to wheels at one side of the vehicle; a similar passage system would be used for supplying air to wheels at the other side of the vehicle. Both passage systems would connect with cavity 25 in selector valve 13.

Each horizontal line 15 is preferably a rigid conduit disposed inside the vehicle or outside the vehicle, according to availability of space; inside locations are preferred. Each branch line 16 is preferably a flexible conduit extending from line 15 to a slip ring assembly 32 on the associated wheel-tire assembly. Each branch line 16 is located outside the vehicle. Due to its flexible nature each line 16 can move freely during normal travel of the roadwheel between the jounce and rebound positions.

During certain operational periods, there may be no anticipated need to change or vary the tire pressure. At such times, the various flexible lines 16 can be detached from the associated wheels and stored elsewhere. Each flexible line can have a conventional quick release connection with line 15 and slip ring assembly 32. Lines 16 can be stored in non-illustrated compartment on the vehicle. Alternately, lines 16 can be left in positions attached to line 15. Each line 16 can be initially formed to have a normal helical coil configuration in its as-formed state. When such a line is detached from the slip ring assembly 32, it will automatically assume a helical coil configuration; such a helical flexible tube can be supported on a post-type support 37, as indicated in connection with the forwardmost branch line in FIG. 1.

The system, as thus far described, is functionally similar to the system shown and described in U.S. Pat. No. 2,944,579. In this connection, selector valve 13 is functionally similar to the valve system shown in FIGS. 7 through 10 of the patented system. However, my proposed system is believed to have certain advantageous features over the system of U.S. Pat. No. 2,944,579, as regards retrofit capability on vehicles not manufactured with central tire inflation capability. Thus, my proposed air passage system 27 (comprised of lines 15 and 16) can be added to existing vehicles with very little modification of the vehicle structure.

The proposed system requires an air slip-ring mechanism on each vehicle wheel. A suitable slip-ring mechanism is shown in FIG. 2.

Figure 2:
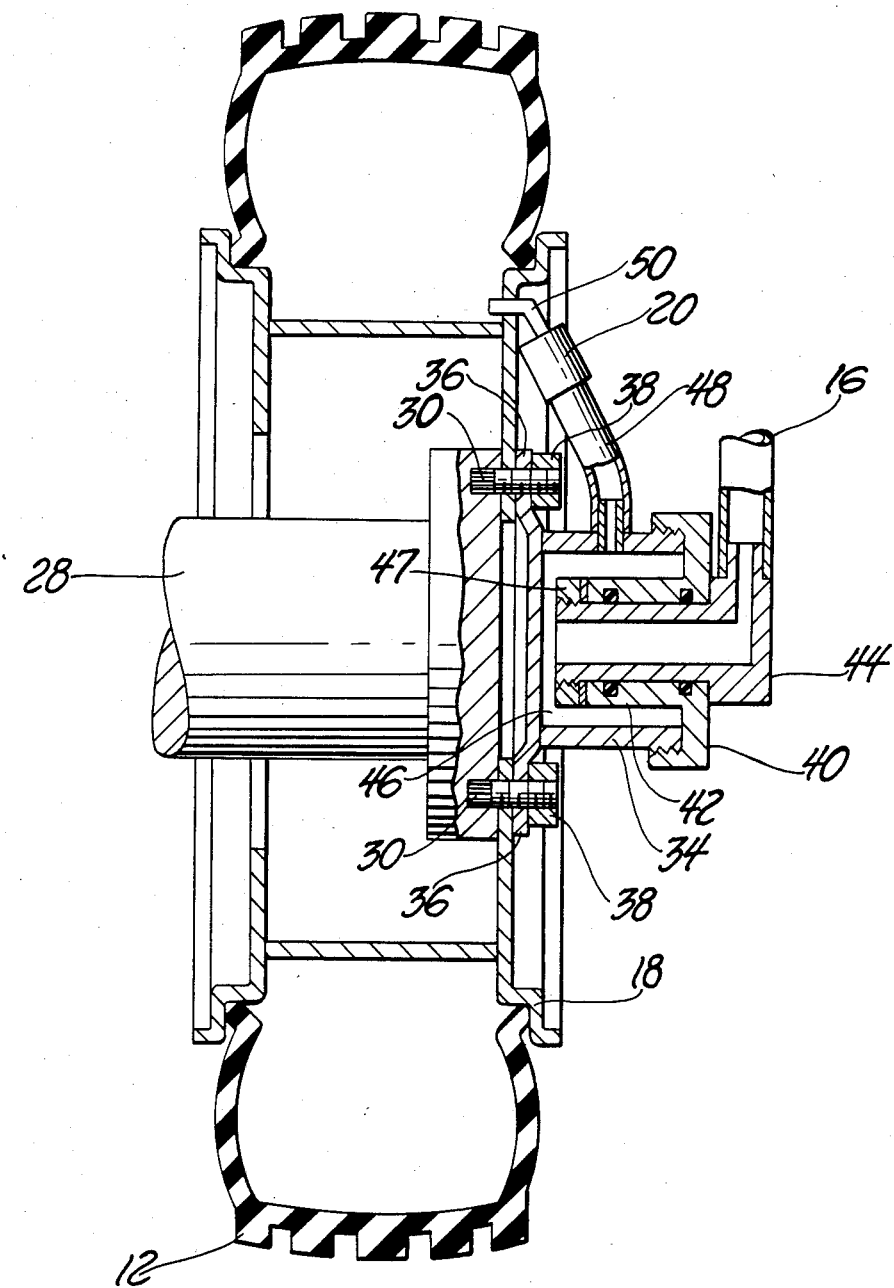
FIG. 2 is a sectional view through a vehicle wheel-tire assembly having an air slip-ring mechanism thereon for practice of the invention.

FIG. 2 Construction

Passage system 27 (FIG. 1) is carried by the vehicle frame. Since roadwheel 18 rotates relative to the frame, it is necessary to provide some sort of fluid slip-ring mechanism at each roadwheel in order to transfer pressurized air from each branch passage 16 to the associated roadwheel. FIG. 2 illustrates the general features of a slip-ring assembly that can be used for this purpose.

FIG. 2 schematically illustrates a rotary axle 28 having a number of studs 30 for mounting wheel 18 thereon. The slip-ring assembly 32 comprises a cylindrical housing 34 having three or more tabs 36 fittable onto selected ones of studs 30. Nuts 38 secure the assembly in place on the exposed end surface of the axle.

A cap 40 having an internal tubular extension 42 is screwed onto housing 34. An air fitting 44 has a swivel fit within tubular extension 42 for transferring pressurized air between hose (passage) 16 and internal space 46 within housing 34. Nut 47 is screwed onto the left end of fitting 44 to prevent inadvertant dislocation of the fitting from the housing. Air is transferred between housing space 46 and pressure control mechanism 20 via hose 48. Mechanism 20 has a screw-on connection with a conventional tire valve 50.

Pressure Control Mechanism

Figures 3, 4:
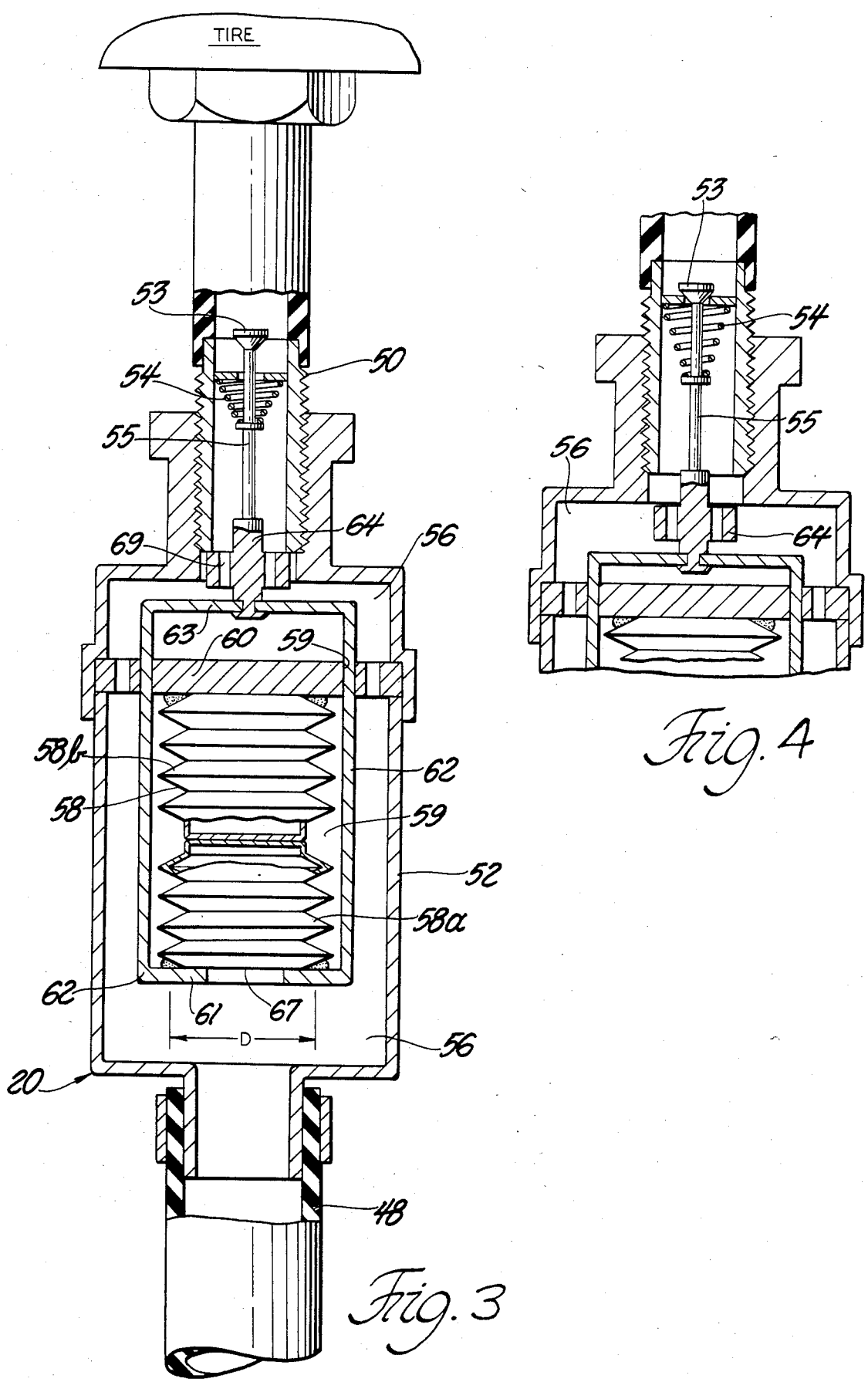
FIG. 3 is a sectional view taken through a pressure control mechanism constructed according to my invention.
FIG. 4 is a fragmentary sectional view of the FIG. 3 mechanism, but in a different adjusted position.

FIGS. 3 and 4 illustrate structural features of pressure control mechanism 20 illustrated schematically in FIG. 2. The mechanism comprises a multi-piece housing structure 52 having a screw-on connection with tire valve 50. Valve 50 is a conventional structure used commercially to control the pressurization and depressurization of vehicle tires; it includes a depressible check valve element 53 having a light compression spring 54 for moving the valve element to a closed position (FIG. 4) when the operating force is removed from stem 55. The valve is retained in its closed position by the spring and by the tire pressure.

Housing structure 52 defines a chamber 56 that is operatively positioned between hose (air passage) 48 and check valve element 53. Disposed within chamber 56 is a sealed pressure-responsive capsule 58 in the form of two sealed bellows 58a and 58b adhered together in end-to-end relationship. For operation of the system only one bellows is essential; the use of two bellows provides parts redundancy for maintaining a measure of operability in the event that one of the bellows should rupture during service.

Capsule 58 is suitably affixed at one end thereof to a partition 60 within chamber 56. The other end of the capsule is suitably affixed to inturned ends 61 of a U-shaped strap 62. The strap walls extend freely through slots 59 in partition 60. Web portion 63 of the strap is affixed to a check valve depressor 64. Strap 62 constitutes a connector means between capsule 58 and depressor 64.

Each bellows 58a and 58b is charged with a gas to a predetermined "at rest" internal pressure slightly above atmospheric, e.g., ten p.s.i.g. The term "at rest" herein refers to the pressure within the capsule when the pressure in surrounding chamber 56 is one atmosphere, i.e., normal atmospheric pressure of 0 p.s.i.g.

The internal pressure within bellows 58a and 58b is sufficient that when chamber 56 is depressurized the bellows expand, such that end wall 67 of the bellows moves away from partition 60. Connector strap 62 thereby draws valve depressor 64 to its FIG. 4 position wherein valve 53 is closed. Tire pressure and spring 54 hold the valve closed.

Depressor 64 has a disengagable connection with valve stem 55, whereby continued expansion of the bellows after closure of valve 53 will not adversely stress the component mechanisms.

By pressurizing chamber 56 to some higher pressure above the pressure within bellows 58a and 58b, it is possible to compress the bellows such that bellows end wall 67 moves toward partition 60; connector strap 62 pushes valve depressor 64 to its FIG. 3 position wherein check valve 53 is opened to permit the tire pressure to vent through openings 69 in depressor 64, and eventually back through hose 48, the FIG. 2 slip-ring mechanism, line 16, line 15, and selector valve 13 (FIG. 1) to atmosphere.

Each bellows 58a and 58b has an effective working area several times the effective area of valve 53. The bellows effective working area is the area of bellows end wall 67 taken across diameter D in FIG. 3. In a typical situation, each bellows would have an effective working area of about one square inch and a gas charging pressure of about 10 p.s.i.g.; such a bellows would develop a valve-closing force of about ten pounds. Tire pressure and spring 54 would contribute a small additional valve-opening force on the order of one pound. The valve 53 opening force is provided by the pressure within chamber 56 acting on bellows end wall.

SYSTEM OPERATION

During normal vehicle operation on hard surface roads the tires will be pressurized to a relatively high pressure, e.g., 60 p.s.i.g. The various air lines 48, 16 and 15 will be depressurized.

If it is desired to lower the tire pressure from a high pressure (e.g., 60 p.s.i.g.) to a lower pressure (e.g. 20 p.s.i.g.) selector valve 13 is operated to momentarily pressurize the various air lines 15, 16 and 48; this is accomplished by rotating element 19 to the INFLATE position wherein port 29 registers with air line 11. Line 48 supplies pressurized air to chamber 56 (FIG. 3), whereupon bellows 58a and 58b are contracted to move depressor 64 forcibly against valve stem 55. The tire valve is thereby opened.

Rotor element 19 is maintained in its INFLATE position only a short period of time, e.g., four or five seconds. Thereafter rotor element 19 is rotated to the DEFLATE position wherein port 29 registers with small vent port 31. In the DEFLATE position the pressurized lines 15, 16 and 48 are vented to atmosphere. Since valve 53 is in an open condition the associated air will also be vented. The size of vent port 31 (FIG. 1) is selected so that during the tire depressurization operation each chamber 56 is at a pressure higher than the pressure within the associated bellows 58a and 58b.

Each valve 53 presents a restriction to air flow out of the associated tire. Therefore, the tire pressure will be appreciably higher than the pressure in the associated chamber 56, especially at the beginning of the tire deflation process. The tire pressure will gradually be lowered due to the fact that a continual air flow is taking place from the tire through valve 53 into chamber 56 and toward vent port 31 (FIG. 1) via the various lines 48, 16 and 15.

Periodically during the tire deflation operation rotor element 19 may be turned to the OFF position. Pressure trapped within the system can then be ascertained from guage 9. Element 19 is switched between the DEFLATE and OFF positions until the desired tire pressure is reached.

When the desired tire pressure is reached (e.g., 20 p.s.i.g.) rotor element 19 is turned to the DEACTIVATE position wherein port 29 registers with large vent port 33. Port 33 is sized to exhaust air from lines 15, 16 and 48 at a fairly high rate, sufficient to lower the pressure in each chamber 56 to a value less than the pressure existing within each associated bellows 58a and 58b. The bellows are thereby enabled to close the associated tire valves 53.

The time required to deflate the tires is dependent on several factors, especially the sizing of tire valve 53 in relation to vent port 31, the volumetric capacities of the tires, and the pressure differential between the initial and final pressures. Deflation times on the order of ten minutes are contemplated. After the deflation process is completed, rotor element 19 may be left in the DEACTIVATE position or turned to the OFF position. The various lines 48, 16 and 15 are preferably depressurized during normal vehicle operations.

If it is desired to raise the tire pressure from a low pressure (e.g., 30 p.s.i.g.) to a higher pressure (e.g., 50 p.s.i.g.), rotor element 19 is turned to the INFLATE position. High pressure air thereby flows from source 10 through line 11 and into port 29 and cavity 25. The pressurized air is distributed via lines 15, 16 and 48 to the various tires. The high pressure in each chamber 56 contracts the associated bellows 58a and 58b, thereby opening the associated valve 53.

Periodically, rotor element 19 is turned to the OFF position to permit a reading of the trapped pressure from guage 9. The tire inflation process is continued until guage 9 is at the desired pressure (e.g., 50 p.s.i.g.).

The selector valve 13 may be varied as to design and operation. My invention is concerned primarily with the construction of the pressure-responsive control mechanism shown in FIGS. 3 and 4.

I wish it to be understood that I do not desire to be limited to the exact details of construction shown and described for obvious modifications will occur to a person skilled in the art, without departing from the spirit and scope of the appended claims.

What is claimed.

1. In a centrally controlled tire inflation/deflation system for a multi-wheeled vehicle, wherein said system comprises a central air pressure source, air passage means between said source and each tire for adding air thereto or withdrawing air therefrom; a check valve at each tire for controlling air flow between the tire and said air passage means, and pressure-responsive control mechanism at each tire for operating the associated check valve between its open and closed positions:

the improvement wherein each check valve comprises a valve housing permanently carried by the associated wheel-tire assembly, a depressible check valve element (53) located within the valve housing, and a compression spring (54) acting on the check valve element to move said element outwardly in the housing, to thereby prevent air flow between the tire and air passage system;

each said pressure-responsive control mechanism comprising a housing structure (52) having a screw-on connection with the associated valve housing, said housing structure defining a chamber (56) operatively positioned between the air passage means and the associated check valve, a sealed pressure-responsive bellows unit (58) operatively located within said chamber in axial alignment with the associated check valve element (53), said bellows unit having a first stationary end wall (at 60) proximate to said check valve element and a second movable end wall (67) remote from the check valve element, a movable valve element depressor (64) located within said housing structure (52) in the space between the stationary end wall of the bellows unit and the depressible check valve element (53), and a strap means (62) operatively connecting the movable end wall of the bellows unit to the valve element depressor;

each bellows unit having an effective working area (D) that is several times the flow area of the associated check valve;

the at-rest pressure within each bellows unit being such that when the chamber (56) pressure is a specified amount above the bellows unit internal pressure the depressor is enabled to operate the associated check valve element (53) to an open position.

* * * * *